(12) United States Patent
Elasser et al.

(10) Patent No.: US 9,960,687 B2
(45) Date of Patent: May 1, 2018

(54) SYSTEM AND METHOD FOR A DC/DC CONVERTER

(71) Applicant: General Electric Company, Schenectady, NY (US)

(72) Inventors: Ahmed Elasser, Niskayuna, NY (US); Mohammed Agamy, Niskayuna, NY (US); Kum Kang Huh, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/174,042

(22) Filed: Jun. 6, 2016

(65) Prior Publication Data
US 2017/0353111 A1    Dec. 7, 2017

(51) Int. Cl.
*H02M 3/335*   (2006.01)
*H02M 1/08*    (2006.01)
(Continued)

(52) U.S. Cl.
CPC ......... *H02M 3/33507* (2013.01); *H02M 1/08* (2013.01); *H02M 3/33584* (2013.01);
(Continued)

(58) Field of Classification Search
CPC .............................. H02M 1/08; H02M 3/3507
See application file for complete search history.

(56) References Cited

U.S. PATENT DOCUMENTS 4,772,994 A    9/1988 Harada et al.
7,042,199 B1   5/2006 Birchenough
(Continued)

FOREIGN PATENT DOCUMENTS

DE    10 2008 005904 A1   8/2008
EP       2 819 291 A1    12/2014
(Continued)

OTHER PUBLICATIONS

"DC-DC converter for Hybrid Electric Vehicle and EV", Arrow Times, p. 9.
(Continued)

*Primary Examiner* — Adolf Berhane
*Assistant Examiner* — Bart Iliya
(74) *Attorney, Agent, or Firm* — Meagher Emanuel Laks; Goldberg & Liao, LLP (57) ABSTRACT

According to some embodiments, an electronic drive circuit is disclosed. The electronic drive circuit includes an energy storage device and a first bridge circuit coupled to the energy storage device. The first bridge circuit includes at least one leg having two switches. The electronic drive circuit also includes a transformer. The transformer includes a first winding coupled to the first bridge circuit and a second winding coupled to the energy storage device through a center tap. The electronic drive circuit further includes a second bridge circuit coupled to the second winding of the transformer. The second bridge circuit includes a pair of switches operable to conduct in both directions and block voltage in both directions. The electronic drive circuit additionally includes a DC bus coupled to the second bridge circuit and a controller, which is configured to buck or boost a DC voltage from the energy storage device to supply to the DC bus as well as buck or boost a DC voltage from the DC bus to supply to the energy storage device.

14 Claims, 7 Drawing Sheets

(51) Int. Cl.
  *H02M 3/337* (2006.01)
  *H02M 1/00* (2006.01)
  *H02M 7/48* (2007.01)

(52) U.S. Cl.
  CPC ........ *H02M 3/337* (2013.01); *H02M 3/33561* (2013.01); *H02M 7/4807* (2013.01); *H02M 2001/0058* (2013.01); *H02M 2001/0093* (2013.01); *H02M 2007/4815* (2013.01)

(56) References Cited

U.S. PATENT DOCUMENTS

| | | | |
|---|---|---|---|
| 7,889,524 | B2 | 2/2011 | Lee et al. |
| 9,099,938 | B2 | 8/2015 | Ilic et al. |
| 9,166,415 | B2 | 10/2015 | Moki et al. |
| 2003/0086280 | A1* | 5/2003 | Bourdillon ........ H02M 3/33561 363/21.12 |
| 2008/0205109 | A1 | 8/2008 | Darroman et al. |
| 2009/0059622 | A1* | 3/2009 | Shimada ........... H02M 3/33584 363/17 |
| 2010/0026218 | A1* | 2/2010 | Ogino .................... B60K 6/445 318/400.3 |
| 2011/0103097 | A1 | 5/2011 | Wang et al. |
| 2011/0317452 | A1 | 12/2011 | Anguelov et al. |
| 2012/0051095 | A1* | 3/2012 | Steigerwald .......... H02M 3/158 363/21.01 |
| 2012/0112702 | A1 | 5/2012 | Steigerwald et al. |
| 2013/0134924 | A1 | 5/2013 | Kanakasabai et al. |
| 2014/0313784 | A1* | 10/2014 | Strzalkowski .... H02M 3/33584 363/17 |
| 2015/0303815 | A1 | 10/2015 | Chen et al. |
| 2016/0276941 | A1 | 9/2016 | Iwaya et al. |

FOREIGN PATENT DOCUMENTS

| | | |
|---|---|---|
| JP | S55-136870 A | 10/1980 |
| WO | 2015172254 A1 | 11/2015 |

OTHER PUBLICATIONS

Diab-Marzouk, Ahmad, "Lightweight DC-DC Converter with Partial Power Processing and MPPO for a Solar powered Airctaft", A thesis Graduate Department of Electrical and Engineering University of Toronto, , p. 53 of 97, 2015.

Fraunhofer IISB, "Bidirectional full SiC 200kW DC-DC Converter for Electric, Hybrid and Fuel Cell Vechicle", Frauhofer Institute for Integrated Systems and Device Technology IISB, p. 2, 2015.

Gargles, Sonya et al., "Isolated Bidirectional DC-DC Converter for Hybrid Electric Vehicle Applications", p. 9.

Sunny, Merin et al., "Battery Interface Converter: DC-DC Bidirectional Non-Inverting Buck Boost Converter for EV, HEV, PHEV Application", International Journal of Engineering Research and General Science, vol. 3, Issue 6, pp. 336-943, Nov.-Dec. 2015.

Yang, Bo, "Chapter 4: LLC Resonant Converter", pp. 94-141.

Extended European Search Report and Opinion issued in connection with corresponding EP Application No. 7174155.6 dated Aug. 18, 2017.

Kirsten, A.L., et al., "HID electronic ballast based on bi-flyback inverter topology", Industry Applications Society Annual Meeting (IAS), pp. 1-7, (Oct. 2012).

* cited by examiner

SYSTEM AND METHOD FOR A DC/DC CONVERTER

BACKGROUND OF THE INVENTION

Embodiments of the present invention relate generally to electric drive systems, including hybrid and electric vehicles, and to stationary drives that are subject to transient or pulsed loads, and more particularly, to a bi-directional buck/boost DC-DC converter for transferring energy between an electrical storage device and a DC bus of the vehicle or drive.

A hybrid electric vehicle (HEV) may combine an internal combustion engine and an electric motor powered by an energy storage device, such as a traction battery, to propel the vehicle. Typically, the electric motor of an HEV is coupled between the internal combustion engine and the transmission to take advantage of the torque increase through the transmission. Such a combination may increase overall fuel efficiency by enabling the combustion engine and the electric motor to each operate in their respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in HEVs to be smaller and more fuel efficient.

A purely electric vehicle (EV) typically uses stored electrical energy to power an electric motor, which propels the vehicle. EVs may use one or more sources of stored electrical energy and are configured to use energy from an external source to re-charge the traction battery or other storage devices. For example, a first source of stored energy (sometimes referred to as an "energy" source) may be used to provide longer-lasting energy while a second source of stored energy (sometimes referred to as a "power" source) may be used to provide higher-power for, for example, acceleration from standstill or boost during operation. First and second sources may include chemical-based batteries or may include ultracapacitors, as examples. Typically, the source(s) of electrical energy (energy and/or power batteries) in EVs are charged via a plug-in charger or other external energy source. With typically complete reliance on plug-in power, an EV may have increased energy storage capacity and driving range as compared to an HEV.

A plug-in hybrid electric vehicle (PHEV) may include both an internal combustion engine and an electric motor powered by an energy storage device, such as a traction battery. Typically a PHEV is configured to use energy from an external source to re-charge the traction battery or other storage devices. Thus, with increased reliance on plug-in power, a PHEV may have increased energy storage capacity and driving range as compared to an HEV.

There are generally two types of PHEV: parallel and series. In a parallel PHEV arrangement, the electric motor is coupled between the internal combustion engine and the transmission, enabling the combustion engine and the electric motor to each operate in respective ranges of increased efficiency, similar to an HEV. In a series PHEV arrangement, the electric motor is coupled between an energy storage device and the vehicle drive axle, while the internal combustion engine is coupled directly to the energy storage device and not to the vehicle drive axle. The series PHEV may also be referred to as an extended range electric vehicle (EREV), in reference to a purely electric drive system, having energy augmentation to the energy storage system via the internal combustion engine and via, for instance, a liquid fuel storage system.

In general, EVs, HEVs, and PHEVs typically include regenerative braking to charge the energy storage devices during braking operations. Also, such vehicles may include on-road and off-road vehicles, golf carts, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery.

Such vehicles may also include DC/DC converters for stepping up (boosting) or stepping down (bucking) the voltage on the DC bus. Conventional DC/DC converters include an inductor coupled to a pair of switches and coupled to a pair of diodes. Each switch is coupled to a respective diode and each switch/diode pair forms a respective half phase module. In this topology, all of the power is processed by the converter, which leads to lower efficiency. Further, there are fewer degrees of freedom with this topology.

Thus, there is a need for a highly efficient bi-directional buck/boost DC/DC converter topology which provides a wide range of output voltages for providing energy to the DC bus as well as for charging one or more energy storage devices.

SUMMARY OF THE INVENTION

According to some embodiments, an electronic drive circuit is disclosed. The electronic drive circuit includes an energy storage device and a first bridge circuit coupled to the energy storage device. The first bridge circuit includes at least one leg having two switches. The electronic drive circuit also includes a transformer. The transformer includes a first winding coupled to the first bridge circuit and a second winding coupled to the energy storage device through a center tap. The electronic drive circuit further includes a second bridge circuit coupled to the second winding of the transformer. The second bridge circuit includes a pair of switches operable to conduct in both directions and block voltage in both directions. The electronic drive circuit additionally includes a DC bus coupled to the second bridge circuit and a controller, which is configured to buck or boost a DC voltage from the energy storage device to supply to the DC bus as well as buck or boost a DC voltage from the DC bus to supply to the energy storage device.

According to some embodiments, a method for operating an electronic drive circuit is disclosed. The method includes coupling an energy storage device to a first bridge circuit. The first bridge circuit includes at least one leg having two switches. The method also includes coupling a first winding of a transformer to the first bridge circuit and coupling a second winding of the transformer to the energy storage device through a center tap. The method further includes coupling a second bridge circuit to the second winding of the transformer. The second bridge circuit includes a pair of switches operable to conduct in both directions and block voltage in both directions. The method additionally includes coupling a DC bus to the second bridge circuit, and configuring a controller to buck or boost a DC voltage output from the energy storage device to supply to the DC bus as well as buck or boost a DC voltage output from the DC bus to supply to the energy storage device.

According to some embodiments, an electric vehicle is disclosed. The vehicle includes an energy storage device and a first bridge circuit coupled to the energy storage device. The first bridge circuit includes at least one leg having two switches. The vehicle also includes a resonant circuit coupled to the first bridge circuit and a transformer, where the transformer includes a first winding coupled to the resonant circuit and a second winding coupled to the energy storage device through a center tap. The vehicle further includes a second bridge circuit coupled to the second winding of the transformer. The second bridge circuit includes a pair of switches operable to conduct in both directions and block voltage in both directions. The vehicle additionally includes a DC bus coupled to the second bridge circuit and a traction drive of the vehicle coupled to the DC bus. The vehicle also includes a controller configured to buck or boost a DC voltage from the energy storage device to supply to the DC bus as well as buck or boost a DC voltage from the DC bus to supply to the energy storage device.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Disclosed herein is a partial power processing bi-directional, buck/boost converter topology. Bi-directional power flow allows battery charging during regenerative braking mode. The converter may be operated in either a step up (boost) or step down (buck) mode, thus allowing optimization of a DC bus voltage according to required motor speed.

Figure 1:
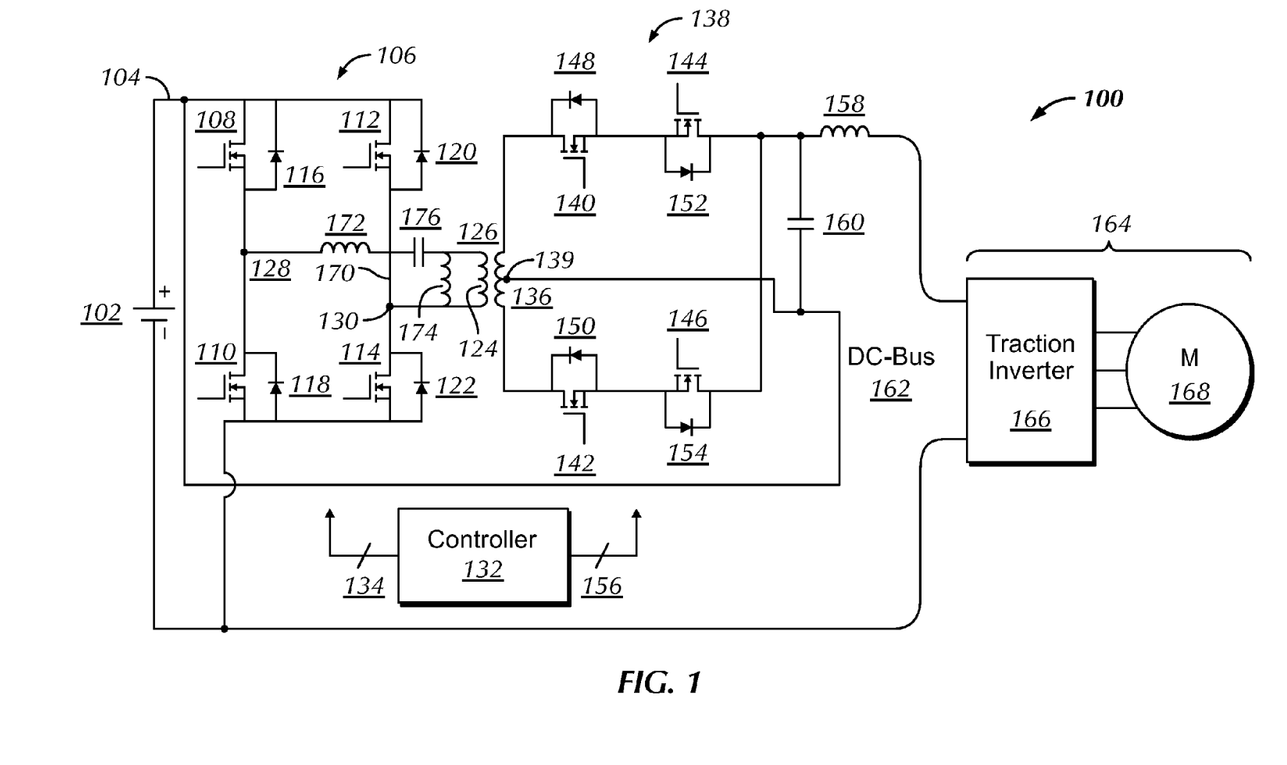
FIG. 1 is a schematic diagram of a traction system according to an embodiment of the present invention.

FIG. 1 illustrates a schematic diagram of a traction system 100 according to an embodiment of the present invention. The traction system 100 may be included in a vehicle such as an electric vehicle (EV), hybrid electric vehicle (HEV), or plug-in hybrid electric vehicle (PHEV). The traction system 100 may alternatively be included in a stationary electric drive system.

Traction system 100 includes an energy storage device 102. As nonlimiting examples, energy storage device 102 may be a battery, a fuel cell, or an ultracapacitor.

The energy storage device 102 is coupled via a DC link 104 to a first bridge circuit 106. The first bridge circuit 106 includes four switches 108-114. As nonlimiting examples, switches 108-114 may be Si or SiC MOSFETs, IGBTs, MCTs, Thyristors, GTOs, IGCTs, cascode switches with SiC JFETs and Si MOSFETs or with GaN HEMTs and Si switches, or cross switches such as a hybrid Si/SiC device: Si IGBTs and SiC Schottky diodes. The first bridge circuit 106 further includes four diodes 116-122 each coupled in parallel with a corresponding switch 108-114. The first bridge circuit 106 is coupled to a primary winding 124 of a transformer 126 via junctions 128 and 130.

In an exemplary embodiment, the first bridge circuit 106 may be used to pulse width modulate (PWM) an input voltage from the energy storage device 102 for input into the primary winding 124 of the transformer 126. This PWM function of the first bridge circuit 106 is controlled by a controller 132, which is coupled to switches 108-114 via control lines 134. The controller 132 controls the action of switches 108-114 by controlling a duty cycle of the PWM (i.e., the length of time the switches stay on/off). In this way, the input voltage from the energy storage device 102 is converted into a PWM voltage input into the primary winding 124 for conversion by the transformer 126 into a secondary voltage in the secondary winding 136 of the transformer 126. In alternative embodiments, the first bridge circuit 106 may be operated by variable frequency or phase shift control. Any of these control methods may be used to regulate the output voltage to a set reference value. Variable frequency control may be used to achieve higher operating efficiency over a wide operating range, while PWM or phase shift may be used closer to the limits of the operating range.

The first bridge circuit 106 may also operate as a rectifier to output a voltage for charging the energy storage device 102. In this case, switches 108-114 remain off through controller 132. Alternatively, switches 108-114 may be switched at a specified phase shift angle to regulate power flow to charge the battery. These operations would occur during regenerative braking, as a nonlimiting example.

The secondary winding 136 of transformer 126 is coupled to a second bridge circuit 138. The secondary voltage generated by the secondary winding 136 of the transformer 126 is input into the second bridge circuit 138. The input voltage of the energy storage device 102 is also input into a center tap 139 of the secondary winding 136 of the transformer 126 to allow some input power to bypass the first bridge circuit 106, thereby increasing the overall efficiency of the traction system 100.

Partial power processing means the converter rating may be made lower than the full power rating. Depending on the battery voltage range and maximum voltage required for the DC bus, the converter may be designed at about 67% the full rating as an example. Partial power processing leads to higher efficiency as part of the input power is fed directly to the output at 100% efficiency.

The second bridge circuit 138 includes four switches 140-146. As nonlimiting examples, switches 140-146 may be Si or SiC MOSFETs, IGBTs, MCTs, Thyristors, GTOs, IGCTs, cascode switches with SiC JFETs and Si MOSFETs or with GaN HEMTs and Si switches, or cross switches such as a hybrid Si/SiC device: Si IGBTs and SiC Schottky diodes. The switches 140-146 may alternatively be reverse blocking or reverse conducting IGBTs. The second bridge circuit 138 further includes four diodes 148-154 each coupled in parallel with a corresponding switch 140-146. The switches 140-146 are AC switches which may conduct in both directions and block voltage in both directions depending on the operation of the switches 140-146. Controller 132 is further coupled to switches 140-146 via control lines 156 to control the action of switches 140-146 to operate the second bridge circuit 138 as a rectifier. An inductor 158 and capacitor 160 are also coupled to the second bridge circuit 138 to filter the output. In this manner, the second bridge circuit 138 outputs a load voltage to a DC bus 162.

In an exemplary embodiment, the DC bus 162 is coupled to a traction drive 164. Traction drive may include an inverter 166 coupled to a traction motor 168. However, in alternative embodiments (not shown), the DC bus 162 may be coupled to a second energy storage device, an electric drive including an inverter and electric motor, or another DC/DC converter to further convert the DC voltage for DC loads such as stepper motors or auxiliary loads (e.g. air conditioning, power windows, or a stereo system).

The second bridge circuit 138 may also be used to PWM a voltage from the DC bus 162 to the secondary winding 136 of transformer 126. The controller 132 controls the action of switches 148-154 by controlling a PWM duty cycle. In this way, the voltage from the DC bus 162 is converted into a PWM voltage input into the secondary winding 136 for conversion by the transformer 126 into another voltage in the primary winding 124 of the transformer 126 for charging the energy storage device 102. In alternative embodiments, the second bridge circuit 138 may be operated by variable frequency or phase shift control. Any of these control methods may be used to regulate the output voltage to a set reference value. Variable frequency control may be used to achieve higher operating efficiency over a wide operating range, while PWM or phase shift may be used closer to the limits of the operating range. PWM, variable frequency, or phase shift control would occur during regenerative braking, as a nonlimiting example.

Traction system 100 may further include a resonant circuit 170 between the first bridge circuit 106 and primary winding 124 of the transformer 126. In the exemplary embodiment shown in FIG. 1, resonant circuit 170 is an LLC circuit, including two inductors (LL) 172 and 174, and capacitor (C) 176. In alternative embodiments, the resonant circuit 170 may be an LC-parallel circuit or an LCC circuit. Including the resonant circuit 170 in traction system 100 provides more degrees of freedom for controlling power flow and voltage regulation. Resonant circuit 170 also provides soft switching, improving overall efficiency. Switching frequency of switches 108-114 dictates the gain of a resonant tank. This can provide step up or step down operation depending on whether the switching frequency is below the series resonant frequency (step-up) or above the series resonant frequency (step-down). The voltage gain of the resonant converter is dependent on the operating frequency. For the LLC resonant circuit as a non-limiting example, the voltage gain is greater than 1 below the series resonant frequency which provides step up capability. The voltage gain is less than 1 above the series resonant frequency which provides step down operation. In PWM control, a duty ratio of 0.5 provides the highest gain, while any other duty ratio gives lower gain. When both step up and step down capability are combined, there is more flexibility in regulating the terminal voltage as well as improving efficiency by achieving zero voltage switching transitions for the active devices.

Figure 2:
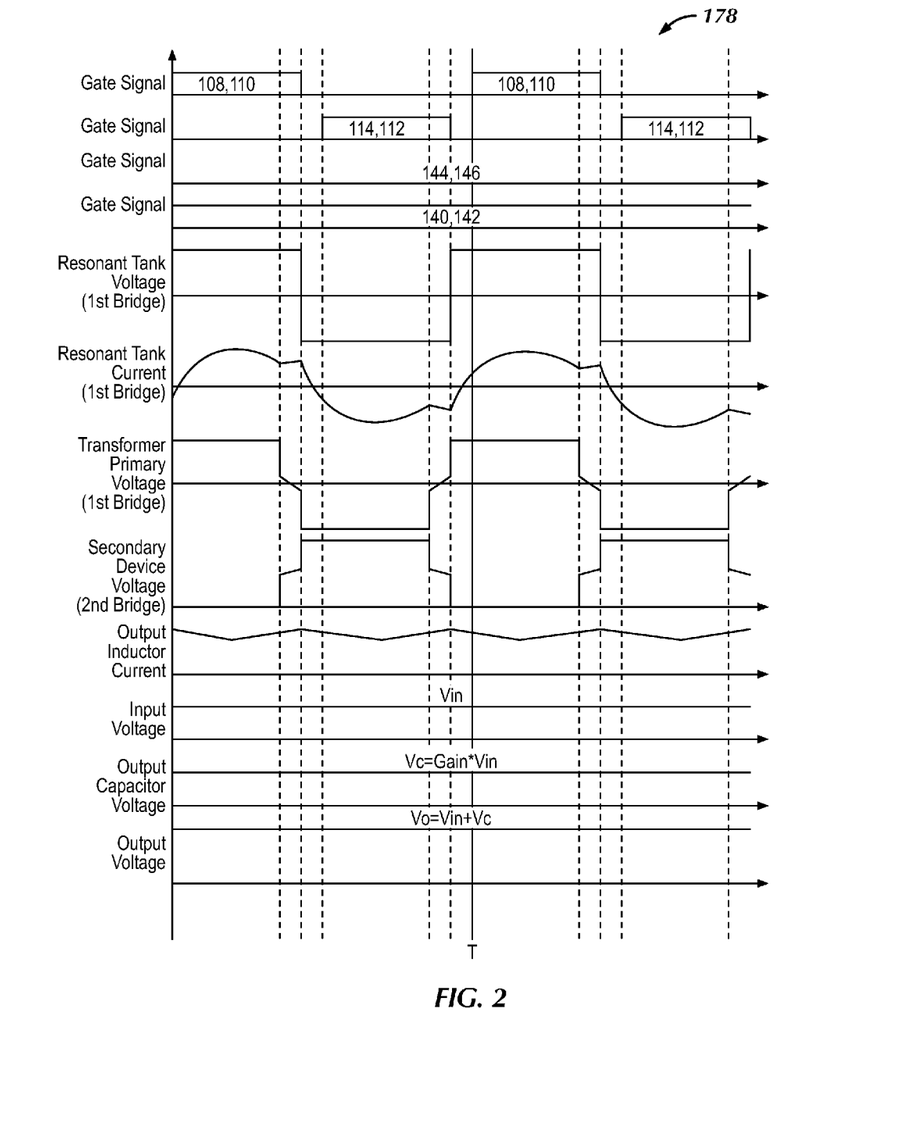
FIG. 2 is a pulse sequence diagram illustrating a gating sequence for discharging an energy storage device by stepping up a voltage of that energy storage device according to an embodiment of the present invention.

FIG. 2 is a pulse sequence diagram 178 illustrating a gating sequence in a step up mode during discharge according to an embodiment of the present invention. In the step up mode, power from the converter is added to the output to increase the voltage. The pulse sequence diagram 166 shows the various waveforms during a single period T.

In a step up mode during discharge of the energy storage device 102, the first bridge circuit 106 may operate as a PWM converter and the second bridge circuit 138 operates as a rectifier. As such, switches 108-114 are pulse width modulated as shown in FIG. 2, and switches 140-142 are turned on while switches 144-146 are turned off. When the switches 108-114 of first bridge circuit 106 are conducting, a voltage is impressed on the secondary winding 136 of the transformer 126. The instantaneous output at the diodes 152-154 is the input voltage of the energy storage device 102 plus the transformer secondary voltage, which is equal to the input voltage divided by the transformer turns ratio $N_p/N_s$. By varying the PWM duty cycle D from 0% to 100%, the average voltage output can be controlled between a minimum of the input voltage and a maximum of the input voltage plus the boost provided by the secondary voltage output of the transformer 126. The maximum gain occurs at 50% duty cycle and symmetrically drops for higher or lower values of the duty cycle. The inductor 158 and capacitor 160 operate as filters to smooth the output voltage. The output voltage thus will be $V_{out}=V_{in}+(\text{Gain})*V_{in}$. For PWM operation, the voltage gain (Gain) is equal to $2*D*(N_s/N_p)$.

The first bridge circuit may also operate as a variable frequency converter. For variable frequency operation when utilizing an LLC resonant converter, the Gain is equal to:

$$\text{Gain} = \left(\frac{N_s}{N_p}\right) * \frac{1}{\sqrt{\left(1 + \frac{1}{\lambda} - \frac{1}{\lambda f_n^2}\right)^2 + Q^2\left(f_n - \frac{1}{f_n}\right)^2}}$$

and $V_{out}=V_{in}(1\pm\text{Gain})$. In this calculation, $f_n$ is the normalized switching frequency $$\left(f_n = \frac{f_s}{f_r}\right),$$

$\lambda$ is the inductance ratio, and Q is the quality factor. If first bridge circuit operates with a combination of PWM and frequency control, the voltage gain will be a combined value. If first bridge circuit operates with a combination of PWM and frequency control, the voltage gain will be a combined value.

For an LLC resonant converter topology, in order to achieve zero voltage switching (ZVS), the switching frequency need to be higher than the resonant frequency, such that the resonant tank current lags the resonant tank voltage. A lagging tank current leads to a negative device current before the device is turned on. This negative current discharges the device/snubber capacitance and then flows through the anti-parallel diode. Therefore, the device voltage drops to zero before it is turned on and thus ZVS is achieved.

The device turn off current is limited to the magnetizing current if the switching frequency $f_s$ is in the range $f_m<f_s<f_r$.

Here, $f_m$ is the overall resonant frequency due to the resonance between the resonant capacitor and combined inductance equal to $$f_m = \frac{1}{2\pi\sqrt{(L_r+L_m)C_r}}$$

and $f_r$ is the series resonant frequency due to the resonance between the inductor and capacitor in series equal to $$f_r = \frac{1}{2\pi\sqrt{L_rC_r}}.$$

Beyond $f_r$, the turn off current becomes much higher and thus the switching loss increases at turn off. To compensate for that, snubber capacitors may be used to limit the device voltage to achieve close to zero voltage switching at turn off.

The quality factor Q of the resonant circuit is $$= \frac{z_C}{R_{ac}},$$

where $Z_C$ is the converter characteristic impedance, which is $$Z_C = \sqrt{\frac{L_r}{C_r}},$$

and $R_{ac}$ is the equivalent load resistance of the series resonant converter, which is $$R_{ac} = \frac{8}{\pi^2}\left(\frac{N_p}{N_s}\right)^2 R_{load}.$$

From the gain characteristics low quality factor provides high gain selectivity below $f_r$ and almost a flat gain characteristic beyond $f_r$. A low quality factor also leads to low voltage across the resonant capacitor, which is reflected to the diode voltage at turn off. Changing the inductance ratio $$\lambda = \frac{L_m}{L_r}$$

also has a significant effect on the converter gain characteristics. A low inductance ratio gives high frequency sensitivity but leads to more circulating current. A high inductance ratio gives low circulating current and thus better efficiency, but the gain characteristic is flat compared to switching frequency. As such, a transformer should have a low quality factor and high inductance ratio to achieve higher efficiency and low component stresses.

For other types of resonant tanks, the Gain will change accordingly but the analysis is similar to the LLC resonant converter topology as described above. For an LC series resonant converter, the Gain is equal to:

$$\text{Gain} = \left(\frac{Ns}{Np}\right) * \frac{1}{\sqrt{1+\frac{\pi^2}{64}Q^2\left(f_n-\frac{1}{f_n}\right)^2}}.$$

For an LC parallel resonant converter, the Gain is equal to:

$$\text{Gain} = \left(\frac{Ns}{Np}\right)\frac{1}{\sqrt{\frac{\pi^2}{64}(1-f_n^2)^2+f_n^2\left(\frac{1}{Q^2}\right)}}.$$

For an LCC series-parallel resonant converter, the Gain is equal to:

$$\text{Gain} = \left(\frac{Ns}{Np}\right)\frac{1}{\sqrt{\frac{\pi^2}{64}\left(1+\frac{C_P}{C_S}(1-f_n^2)\right)^2+Q^2\left(f_n-\frac{1}{f_n}\right)^2}}.$$

Figure 3:
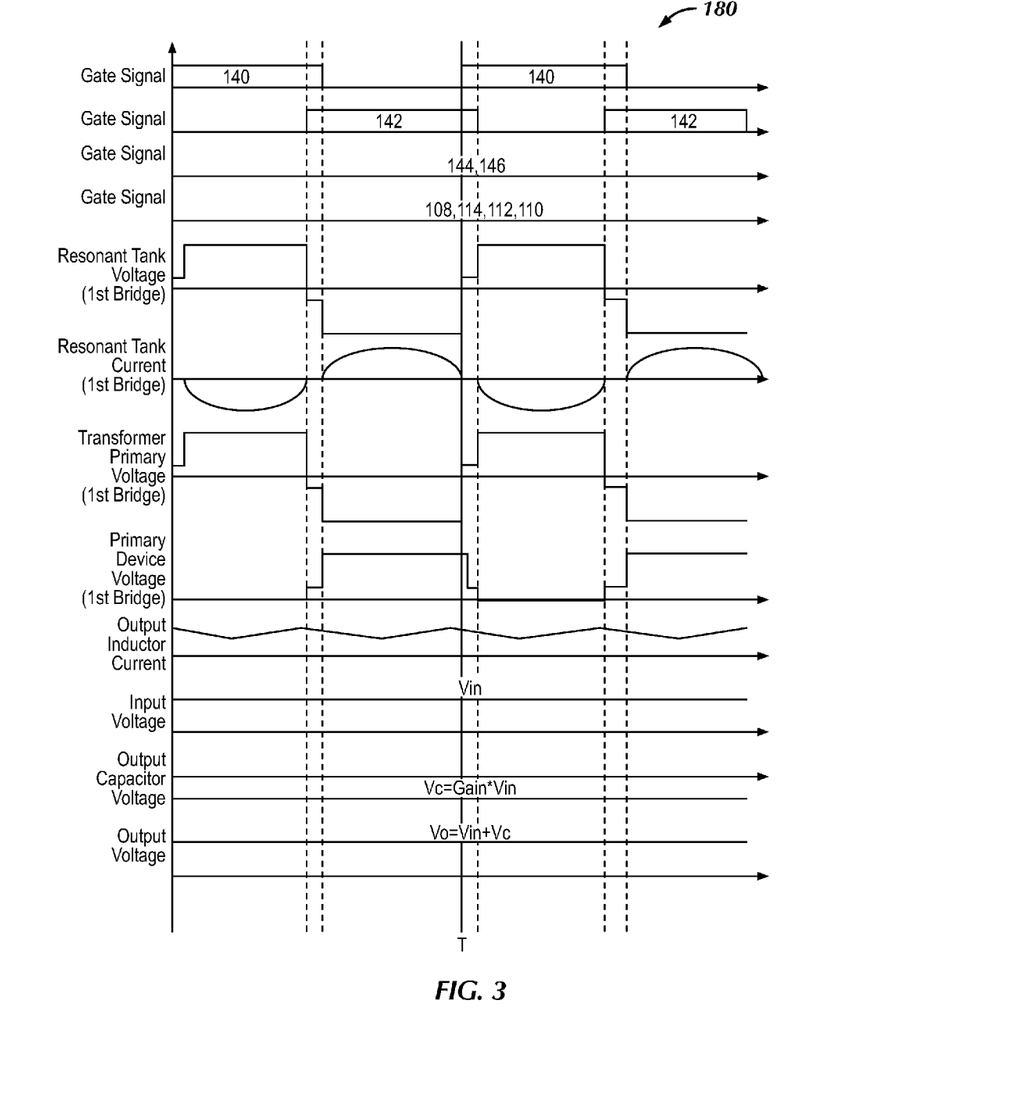
FIG. 3 is a pulse sequence diagram illustrating a gating sequence for discharging an energy storage device by stepping down the voltage of that energy storage device according to an embodiment of the present invention.

FIG. 3 is a pulse sequence diagram 180 illustrating a gating sequence in a step down mode during discharge according to an embodiment of the present invention. In the step down mode, the input voltage is greater than the desired output voltage. The pulse sequence diagram 168 shows the various waveforms during a single period T.

In a step down mode during discharge of the energy storage device 102, the first bridge circuit 106 operates as a full wave diode rectifier and the second bridge circuit 138 operates as a PWM converter. As such, switches 108-114 and 144-146 are turned off, while switches 140-142 are pulse width modulated as shown in FIG. 3. In step down operation, the secondary winding 136 of the transformer 126 acts as a primary winding, whereas the primary winding 124 of the transformer 126 acts as a secondary winding.

The output voltage of the second bridge circuit 138 is recirculated back to the first bridge circuit 106. Varying the duty cycle of the switches 140-142 controls the ratio between the input and output voltage of the second bridge circuit 138. Since the input voltage of the energy storage device 102 fixes the output voltage of the second bridge circuit 138, the effect of varying the duty cycle is to vary the voltage drop between the first bridge circuit 106 and the output voltage. Switches 140-142 are controlled such that either one or both switches are always turned on; they are never both off simultaneously, even during the switching cycle. When both switches are conducting there is no voltage drop across the input of the second bridge circuit 138, so the output voltage is equal to its input voltage. When one switch is open, the voltage across the transformer 126 will be equal to the input voltage of the energy storage device 102 since it is clamped to that value by the first bridge circuit 106. Therefore, the input voltage across the second bridge circuit 138 will be equal to the input voltage of the energy storage device 102 divided by the transformer turns ratio. Varying the duty cycle controls the average voltage dropped across the second bridge circuit 138, and therefore the output voltage. The output voltage thus will be $V_{out}=V_{in}-2*V_{in}*(1-D)*(N_s/N_p)$.

The second bridge circuit may also operate as a variable frequency converter. For variable frequency operation when utilizing a LLC resonant converter, the Gain is equal to:

$$\text{Gain} = \left(\frac{Ns}{Np}\right) * \frac{1}{\sqrt{\left(1 + \frac{1}{\lambda} - \frac{1}{\lambda f_n^2}\right)^2 + Q^2\left(f_n - \frac{1}{f_n}\right)^2}}$$

and $V_{out} = V_{in}(1 \pm \text{Gain})$.

Figure 4:
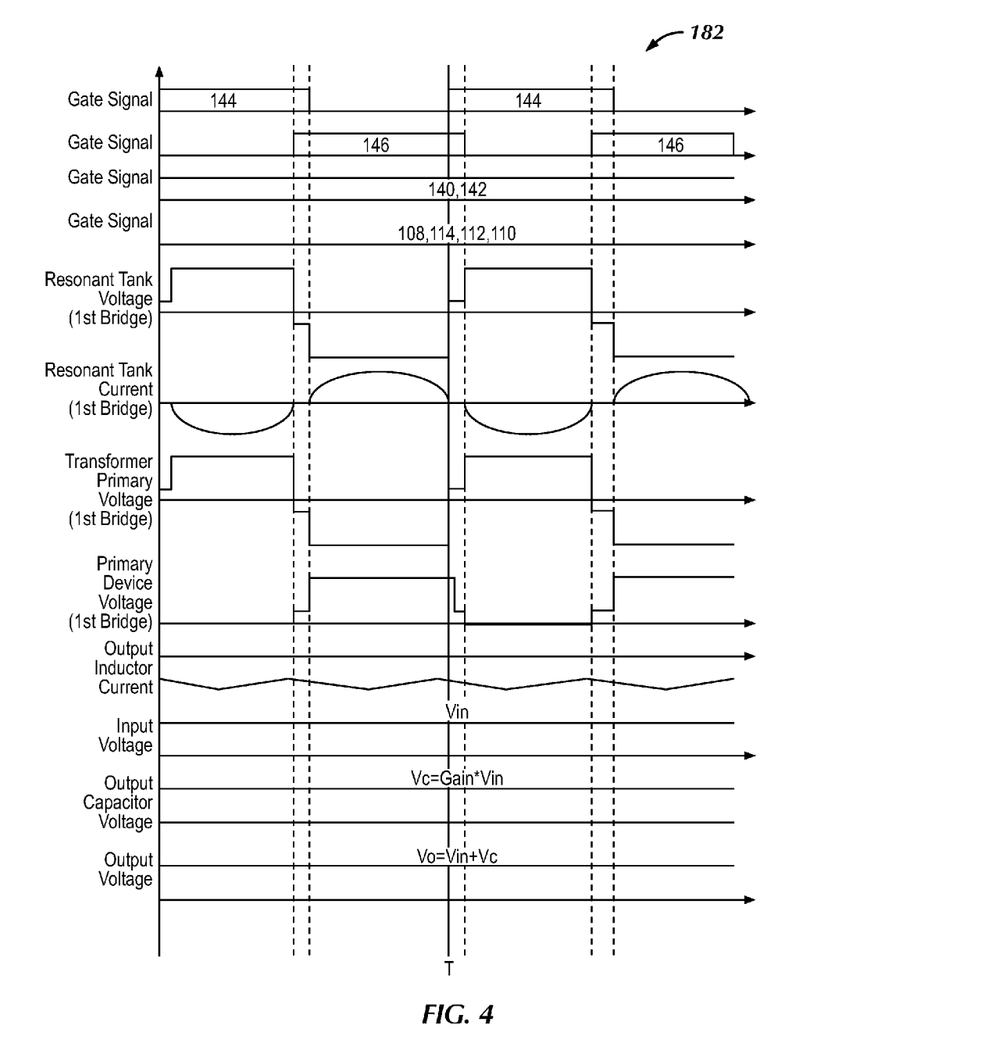
FIG. 4 is a pulse sequence diagram illustrating a gating sequence for charging an energy storage device by stepping up a DC bus voltage according to an embodiment of the present invention.

FIG. 4 is a pulse sequence diagram 182 illustrating a gating sequence for charging the energy storage device 102 by stepping up an input voltage from the DC bus 162 according to an embodiment of the present invention. In this case, the first bridge circuit 106 operates as a full wave rectifier and the second bridge circuit 138 operates as a PWM converter. As such, switches 108-114 are turned off, switches 140-142 are turned on, and switches 144-146 are pulse width modulated as shown in FIG. 4.

The output voltage of the first bridge circuit 106 is recirculated back to the second bridge circuit 138. Varying the duty cycle of the switches 144-146 controls the ratio between the input and output voltage of the first bridge circuit 106. Since the input voltage of the DC bus 162 fixes the output voltage of the first bridge circuit 106, the effect of varying the duty cycle is to vary the voltage drop between the second bridge circuit 138 and the output voltage. Switches 144-146 are controlled such that either one or both switches are always turned on; they are never both off simultaneously, even during the switching cycle. When both switches are conducting there is no voltage drop across the input of the second bridge circuit 138, so the output voltage is equal to its input voltage. When one switch is open, the voltage across the transformer 126 will be equal to the input voltage of the DC bus 162 since it is clamped to that value by the second bridge circuit 138. Therefore, the input voltage across the first bridge circuit 106 will be equal to the input voltage of the DC bus 162 divided by the transformer turns ratio. By varying the PWM duty cycle, the average voltage output to charge the energy storage device 102 can be controlled between a minimum of the input voltage and a maximum of the input voltage plus the boost provided by the voltage output from the transformer 126. The output voltage thus will be $V_{out} = V_{in} + 2*D*(N_s/N_p)*V_{in}$.

The second bridge circuit may also operate as a variable frequency converter. For variable frequency operation when utilizing an LLC resonant converter, the Gain is equal to:

$$\text{Gain} = \left(\frac{Ns}{Np}\right) * \frac{1}{\sqrt{\left(1 + \frac{1}{\lambda} - \frac{1}{\lambda f_n^2}\right)^2 + Q^2\left(f_n - \frac{1}{f_n}\right)^2}}$$

and $V_{out} = V_{in}(1 \pm \text{Gain})$. If first bridge circuit operates with a combination of PWM and frequency control, the voltage gain will be a combined value.

Figure 5:
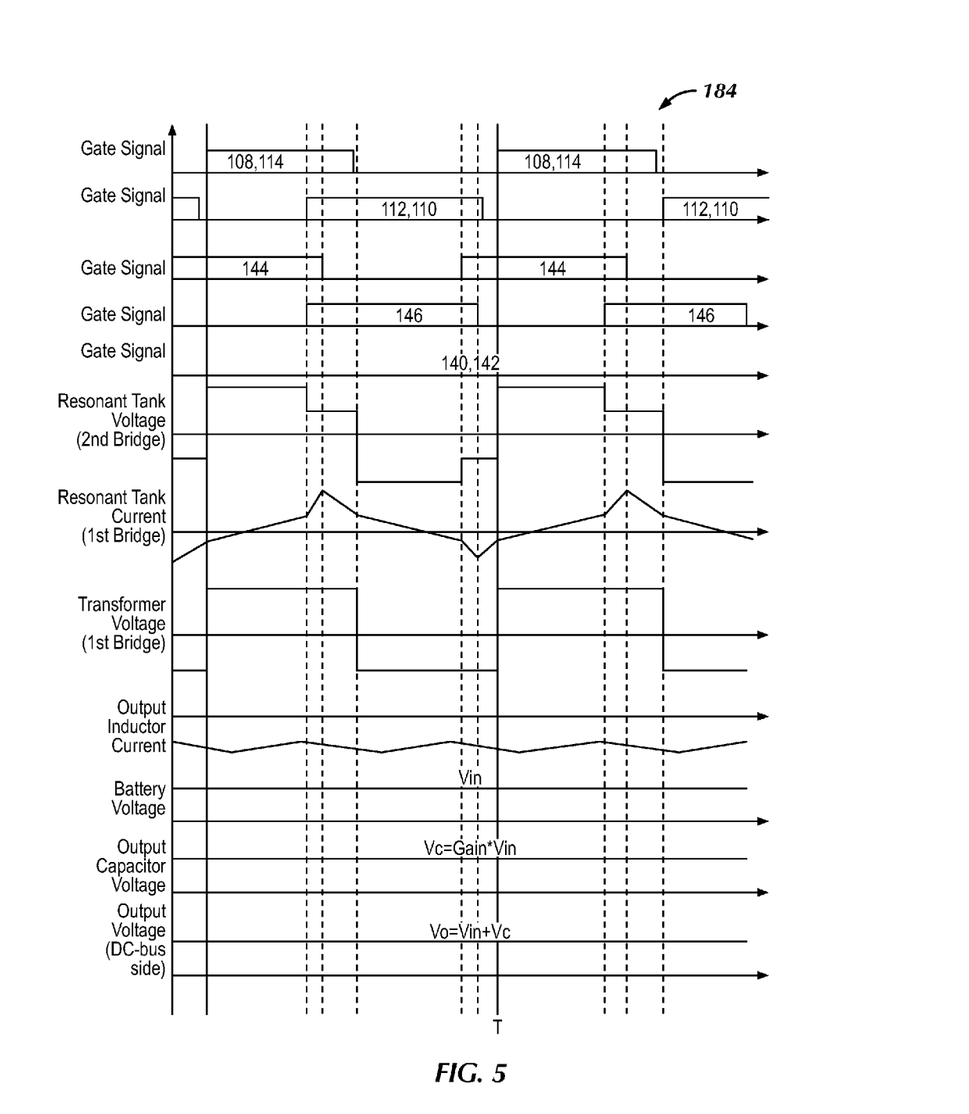
FIG. 5 is a pulse sequence diagram illustrating a gating sequence for charging an energy storage device by stepping down the DC bus voltage according to an embodiment of the present invention.

FIG. 5 is a pulse sequence diagram 184 illustrating a gating sequence for charging an energy storage device by stepping down the input voltage according to an embodiment of the present invention. In this case, both bridge circuits 106 and 138 are operating as variable frequency converters. As such, switches 140-142 are turned off, and switches 108-114 and 144-146 are phase shifted as shown in FIG. 4. Variable frequency is used to adjust the gain between the two bridges 106 and 138. The phase shift between the two bridges 106 and 138 regulates the amount of current flowing between the two sides. This mode of operation is similar to a resonant dual active bridge. Switches 140-142 are turned off in order to maintain power flow direction to charge the energy storage device 102. Soft switching still occurs, where the first bridge circuit 106 operates under zero current switching while the second bridge circuit 138 operates with zero voltage switching. The Gain is equal to:

$$\text{Gain} = \left(\frac{Ns}{Np}\right) * \frac{1}{\sqrt{\left(1 + \frac{1}{\lambda} - \frac{1}{\lambda f_n^2}\right)^2 + Q^2\left(f_n - \frac{1}{f_n}\right)^2}}$$

and $V_{out} = V_{in}(1 \pm \text{Gain})$.

Figure 6:
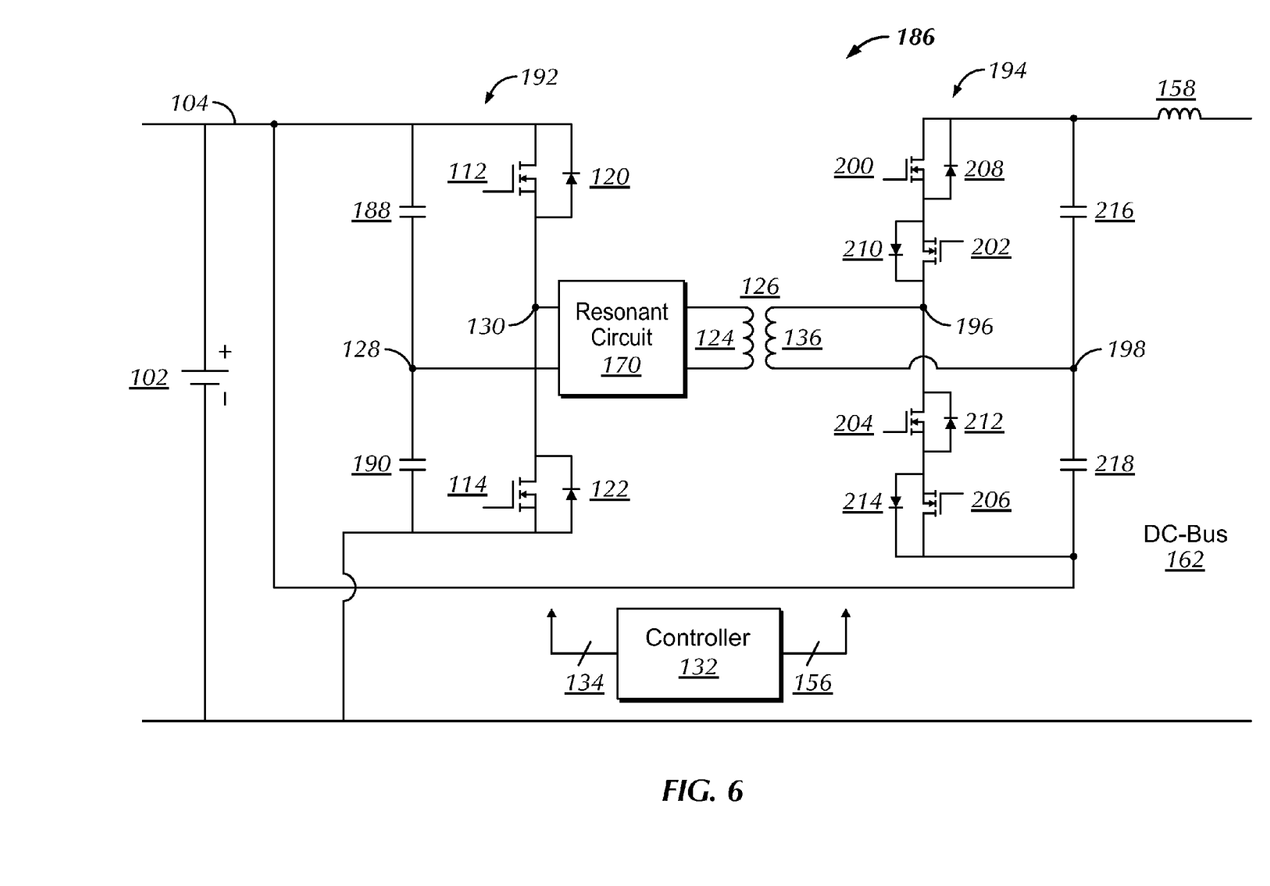
FIG. 6 is a schematic diagram of a traction system according to another embodiment of the present invention.

FIG. 6 is a schematic diagram of a traction system 186 according to an alternative embodiment of the present invention. Elements and components common to traction system 100 are referred to herein with similar part numbering as appropriate. In this half bridge embodiment, switches 108-110 are replaced with capacitors 188-190 in a first half bridge 192. The secondary winding 136 of transformer 126 is coupled to a second half bridge 194 via junctions 196 and 198. The second half bridge 194 includes four switches 200-206 coupled via junction 196, each switch coupled in parallel with a corresponding diode 208-214. The second half bridge 194 further includes two capacitors 216-218 coupled via junction 198. A resonant circuit 170 may be included between the first half bridge 192 and the primary winding 124 of the transformer 126 as well.

Traction system 186 operates similar to the embodiments discussed previously. For discharge step up mode corresponding to FIG. 2, switches 112 and 114 will be switching (via either PWM or variable frequency control) on the first bridge 192. On the second bridge 194, switches 200 and 204 are turned off while switches 202 and 206 are turned on. For discharge step down mode corresponding to FIG. 3, switches 112-114, 200, and 204 are turned off, while switches 202 and 206 are switching (via either PWM or variable frequency control). For charge step up mode corresponding to FIG. 4, switches 112-114, 202, and 206 are turned off, while switches 200 and 204 are switching (via either PWM or variable frequency control to regulate charging current and gain). For charge step down mode corresponding to FIG. 5, switches 202 and 206 are turned off, while switches 112-114, 200, and 204 are switching (via either PWM or variable frequency control). The variable frequency control regulates the gain, and the phase shift between first and second bridges 192 and 194 regulates the charging current. In this embodiment, the second bridge 194 operates as a voltage doubler rectifier, and as such, can be used for applications where higher voltage gain is needed.

Figure 7:
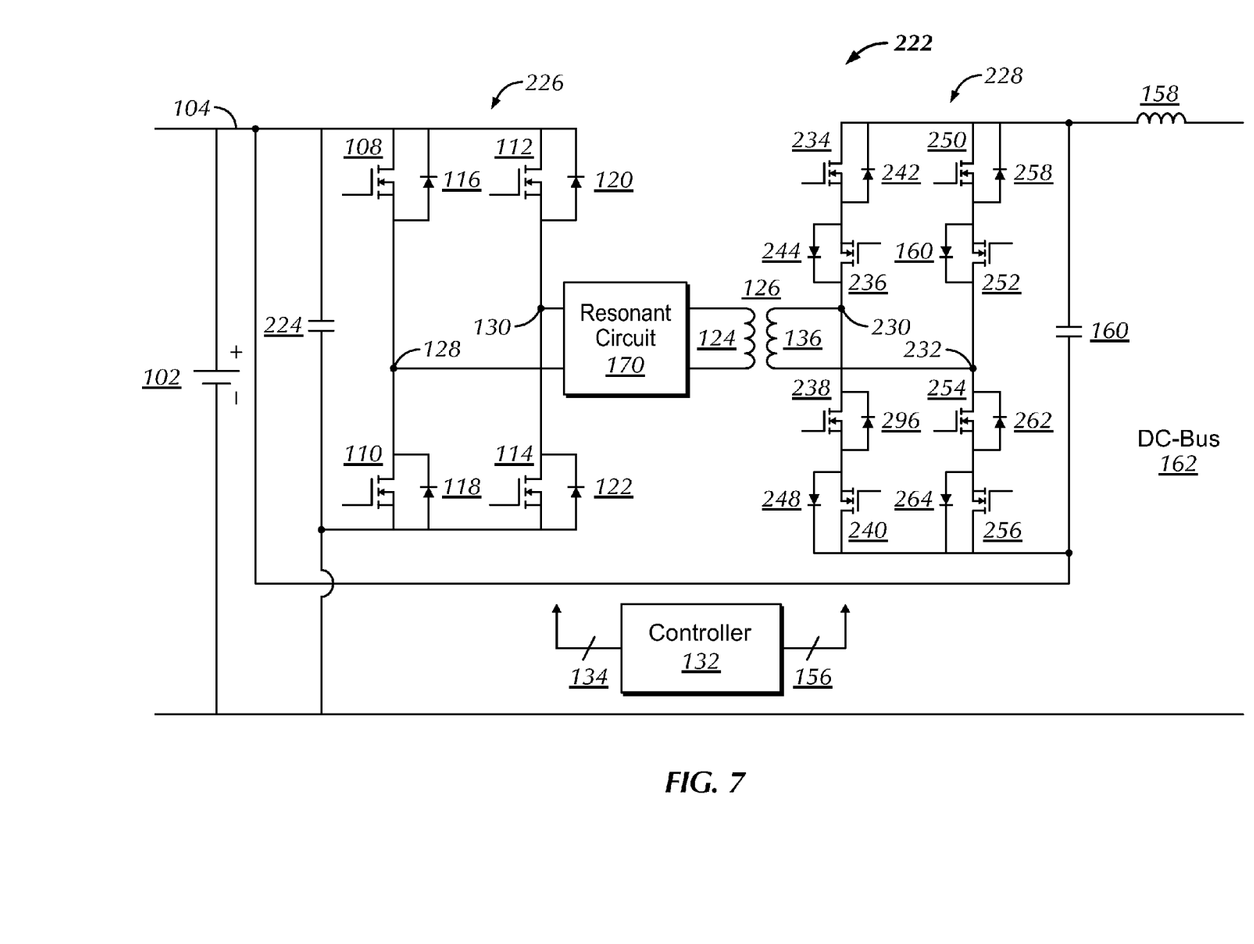
FIG. 7 is a schematic diagram of a traction system according to another embodiment of the present invention.

FIG. 7 is a schematic diagram of a traction system 222 according to another alternative embodiment of the present invention. Elements and components common to traction system 100 are referred to herein with similar part numbering as appropriate. In this full bridge embodiment, an additional capacitor 224 is included in a first full bridge 226. The secondary winding 136 of transformer 126 is coupled to a second full bridge 228 via junctions 230 and 232. The second full bridge 228 includes four switches 234-240 coupled via junction 230, each switch coupled in parallel with a corresponding diode 242-248. The second full bridge 228 further includes four switches 250-256 coupled via junction 232, each switch coupled in parallel with a corresponding diode 258-264. A resonant circuit 170 may be included between the first full bridge 226 and the primary winding 124 of the transformer 126 as well.

Traction system 222 operates similar to the embodiments discussed previously, but is better suited for higher power applications. For discharge step up mode corresponding to FIG. 2, switches 108-114 are switching (via PWM or variable frequency control). The second bridge 228 operates in a rectifier mode, such that switches 234, 238, 250, and 254 are turned off while switches 236, 240, 252, and 256 are turned on. For discharge step down mode corresponding to FIG. 3, switches 108-114 are turned off. Switches 234, 238, 250 and 254 are also turned off, while switches 236, 240, 252, and 256 are switching (via PWM or variable frequency control to regulate voltage gain). For charge step up mode corresponding to FIG. 4, switches 108-114 are turned off. Switches 236, 240, 252, and 256 are turned off while switches 234, 238, 250, and 254 are switching (via PWM or variable frequency control to regulate voltage gain and charging current). For charge step down mode corresponding to FIG. 5, switches 108-114 are switching (via PWM and/or variable frequency control). Switches 236, 240, 252, and 256 are turned off while switches 234, 238, 250, and 254 are switching (via PWM and/or variable frequency control to regulate the voltage gain). Charging current is controlled by the phase shift between switches 234, 238, 250, and 254 and the first bridge switches 108-114.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. An electronic drive circuit for DC/DC conversion, the circuit comprising:
    an energy storage device;
    a first bridge circuit coupled to the energy storage device, the first bridge circuit comprising at least one leg having two switching devices;
    a transformer comprising:
        a first winding coupled to the first bridge circuit; and
        a second winding coupled to the energy storage device through a center tap;
    a second bridge circuit coupled to the second winding of the transformer, the second bridge circuit comprising at least one pair of switching devices connected in series, the pair of switching devices operable to allow current to flow in both directions;
    a DC bus coupled to the second bridge circuit; and
    a controller configured to operate the switching devices to:
        buck a DC voltage from the energy storage device to supply to the DC bus in a first mode of operation;
        boost a DC voltage from the energy storage device to supply to the DC bus in a second mode of operation, wherein the controller is configured to operate the first bridge circuit as a pulse width modulated, variable frequency, or phase shift converter and the second bridge circuit as a rectifier during the first and second modes of operation;
        buck a DC voltage from the DC bus to supply to the energy storage device in a third mode of operation; and
        boost a DC voltage from the DC bus to supply to the energy storage device in a fourth mode of operation, wherein the controller is configured to operate the first bridge circuit as a rectifier and the second bridge circuit as a pulse width modulated converter during the third and fourth modes of operation.

2. The circuit of claim 1, further comprising a resonant circuit coupled between the first bridge circuit and first winding of the transformer.

3. The circuit of claim 2, wherein the resonant circuit comprises an inductor coupled to a capacitor.

4. The circuit of claim 1, wherein the controller is configured to operate both bridges with bridge-to-bridge phase shift control in combination with variable frequency and pulse width modulation control.

5. The circuit of claim 1, further comprising a filter capacitor and inductor coupled between the second bridge circuit and DC bus.

6. The circuit of claim 1, wherein the DC bus is coupled to a traction drive system comprising an inverter and traction motor.

7. The circuit of claim 1, wherein the DC voltage is supplied to the energy storage device during the third and fourth modes of operation via regenerative braking.

8. A method for operating an electronic drive circuit, comprising:
    coupling an energy storage device to a first bridge circuit, the first bridge circuit comprising at least one leg having two switching devices;
    coupling a first winding of a transformer to the first bridge circuit;
    coupling a second winding of the transformer to the energy storage device through a center tap;
    coupling a second bridge circuit to the second winding of the transformer, the second bridge circuit comprising at least one pair of switching devices connected in series, the pair of switching devices operable to allow current to flow in both directions;
    coupling a DC bus to the second bridge circuit; and
    configuring a controller to operate the switching devices to:
        buck a DC voltage from the energy storage device to supply to the DC bus in a first mode of operation;
        boost a DC voltage output from the energy storage device to supply to the DC bus in a second mode of operation, wherein the controller is configured to operate the first bridge circuit as a pulse width modulated, variable frequency, or phase shift converter and the second bridge circuit as a rectifier during the first and second modes of operation;
        buck a DC voltage from the DC bus to supply to the energy storage device in a third mode of operation; and
        boost a DC voltage output from the DC bus to supply to the energy storage device in a fourth mode of operation, wherein the controller is configured to operate the first bridge circuit as a rectifier and the second bridge circuit as a pulse width modulated converter during the third and fourth modes of operation.

9. The method of claim 8, further comprising coupling a resonant circuit between the first bridge circuit and transformer.

10. The method of claim 9, wherein the resonant circuit comprises an inductor coupled to a capacitor.

11. An electric vehicle comprising:
    an energy storage device;
    a DC/DC converter comprising:
       a first bridge circuit coupled to the energy storage device, the first bridge circuit comprising at least one leg having two switching devices;
       a resonant circuit coupled to the first bridge circuit;
       a transformer comprising:
          a first winding coupled to the resonant circuit; and
          a second winding coupled to the energy storage device through a center tap; and
       a second bridge circuit coupled to the second winding of the transformer, the second bridge circuit comprising at least one pair of switching devices connected in series, the pair of switching devices operable to allow current to flow in both directions;
    a traction drive system coupled to the second bridge circuit, the traction drive system comprising an inverter and traction motor; and
    a controller configured to operate the DC/DC converter to:
       buck a DC voltage from the energy storage device to supply to the traction drive system in a first mode of operation;
       boost a DC voltage from the energy storage device to supply to the traction drive system in a second mode of operation, wherein the controller is configured to operate the first bridge circuit as a pulse width modulated, variable frequency, or phase shift converter and the second bridge circuit as a rectifier during the first and second modes of operation;
       buck a DC voltage from the traction drive system to supply to the energy storage device in a third mode of operation; and
       boost a DC voltage from the traction drive system to supply to the energy storage device in a fourth mode of operation, wherein the controller is configured to operate the first bridge circuit as a full wave diode rectifier and the second bridge circuit as a pulse width modulated converter during the third and fourth modes of operation.

12. The vehicle of claim 11, wherein the resonant circuit comprises an inductor coupled to a capacitor.

13. The vehicle of claim 11, further comprising a filter capacitor and inductor coupled between the second bridge circuit and traction drive system.

14. The vehicle of claim 11, wherein the DC voltage is supplied to the energy storage device during the third and fourth modes of operation via regenerative braking.

* * * * *